(12) United States Patent
Garms et al.

(10) Patent No.: US 7,694,022 B2
(45) Date of Patent: Apr. 6, 2010

(54) METHOD AND SYSTEM FOR FILTERING COMMUNICATIONS TO PREVENT EXPLOITATION OF A SOFTWARE VULNERABILITY

(75) Inventors: Jason Garms, Woodinville, WA (US); Chuanxiong Guo, Nanjing (CN); Daniel R. Simon, Seattle, WA (US); Jiahe Helen Wang, Issaquah, WA (US); Alf Peter Zugenmaier, Cambs (GB)

(73) Assignee: Microsoft Corporation, Redmond, WA (US)

( * ) Notice: Subject to any disclaimer, the term of this patent is extended or adjusted under 35 U.S.C. 154(b) by 1588 days.

(21) Appl. No.: 10/955,963

(22) Filed: Sep. 30, 2004

(65) Prior Publication Data
US 2005/0198110 A1 Sep. 8, 2005

Related U.S. Application Data

(60) Provisional application No. 60/547,131, filed on Feb. 24, 2004.

(51) Int. Cl.
G06F 15/173 (2006.01)
G06F 15/16 (2006.01)
G06F 11/00 (2006.01)

(52) U.S. Cl. .................. 709/249; 709/224; 709/230; 714/4; 714/39

(58) Field of Classification Search ............. 726/11–14; 709/230, 223–227; 714/4
See application file for complete search history.

(56) References Cited

U.S. PATENT DOCUMENTS

2002/0124187 A1 9/2002 Lyle et al.
2003/0014662 A1* 1/2003 Gupta et al. ............... 713/200
2003/0204632 A1 10/2003 Willebeek-LeMair et al.
2004/0093513 A1* 5/2004 Cantrell et al. ............. 713/201

FOREIGN PATENT DOCUMENTS

WO    WO 01/65330 A2    9/2001

OTHER PUBLICATIONS

"DCE 1.1: Remote Procedure Call," Technical Standard, CAE Specification, © The Open Group, 748 pages.

(Continued)

*Primary Examiner*—William C Vaughn, Jr.
*Assistant Examiner*—Carlos R Perez Toro
(74) *Attorney, Agent, or Firm*—Perkins Coie LLP

(57) ABSTRACT

A method and system for protecting an application that implements a communication protocol against exploitation of a communication-based vulnerability is provided. A protection system provides a protection policy that specifies how to recognize messages that expose a specific vulnerability and specifies actions to take when the vulnerability is exposed. A protection policy specifies the sequence of messages and their payload characteristics that expose a vulnerability. The protection system may specify the sequences of messages using a message protocol state machine. A message protocol state machine of an application represents the states that the application transitions through as it receives various messages. The message protocol state machine of the protection policy may be a portion of the message protocol state machine of the application relating to the vulnerability. The protection system uses the message protocol state machine to track the states that lead up to the exposing of the vulnerability.

16 Claims, 6 Drawing Sheets

OTHER PUBLICATIONS

R. Fielding, H. Frystyk, T. Berners-Lee, J. Gettys, and J.C. Mogul, "Hypertext Transfer Protocol—HTTP/1.1," Jun. 3, 1996, HTTP Working Group, Internet-Draft, 105 pages.

"Flex—a scanner generator—Table of Contents," Free Software Foundation, 1997, 1 page, http://www.gnu.org/software/flex/manual.

"Snort—the de facto standard for intrusion detection/prevention", 1 page, http://www.snort.org/, [last accessed Jul. 22, 2005].

Bashar, Mohd A., Ganesh Krishnan, Markus G. Kuhn, Eugene H. Spafford and S.S. Wagstaff, Jr., "Low-Threat Security Patches and Tools," Proceedings of International Conference on Software Maintenance, Oct. 1-3, 1997, Bari, Italy, IEEE Computer Society, pp. 306-313.

Beattie, Steve, Seth Arnold, Crispin Cowan, Perry Wagle and Chris Wright, "Timing the Application of Security Patches for Optimal Uptime," 2002 LISA XVI, Nov. 3-8, 2002, Philadelphia, PA, pp. 101-110.

Byacc, 1 page, http://dickey.his.com/byacc/byacc.html.

Chen, Shuo et al., "A Data-Driven Finite State Machine Model for Analyzing Security Vulnerabilities," Proceedings of the 2003 International Conference on Dependable Systems and Networks, © 2003 IEEE, 10 pages.

Chen, Zesheng, Lixin Gao and Kevin Kwiat, "Modeling the Spread of Active Worms," IEEE INFOCOM 2003, 11 pages.

EP Search Report, Oct. 14, 2005, 4 pages.

Ganger, Gregory R., Gregg Economou and Stanley M. Bielski, "Finding and containing enemies within the walls with self-securing network interfaces," Technical Report CMU-CS-03-109, Carnegie Mellon University, Jan. 2003, 24 pages.

H. Schulzrinne, S. Casner, R. Frederick, and V. Jacobson, "RFC 1889—RTP: A Transport Protocol for Real-Time Applications," Audio-Video Transport Working Group, Jan. 1996, 75 pages.

Handley, Mark, Vern Paxson and Christian Kreibich, "Network Intrusion Detection: Evasion, Traffic Normalization, and End-to-End Protocol Semantics," In Proceedings of USENIX Security Symposium, Aug. 2001, 17 pages.

Hsieh, Hung-Yun and Raghupathy Sivakumar, "A Transport Layer Approach for Achieving Aggregate Bandwidths on Multi-homed Mobile Hosts," MOBICOM, Sep. 23-26, 2002, Atlanta, Georgia, ACM 2002, 12 pages.

J. Postel and J. Reynolds, "RFC 854—Telnet Protocol Specification," May 1983, pp. 1-15.

J. Postel and J. Reynolds, "RFC 959—File Transfer Protocol (FTP)" Obsoletes RFC: 765, Oct. 1985, pp. 1-69.

Kamara, Seny, Sonia Fahmy, Eugene Schultz, Florian Kerschbaum and Michael Frantzen, "Analysis of vulnerabilities in Internet firewalls," Computers & Security, vol. 22. No. 3, © Elsevier 2003, pp. 214-232.

Klensin, J., "RFC 2821 Simple Mail Transfer Protocol," Network Working Group, Apr. 2001, 70 pages.

Kohler, Eddie, Benjie Chen, M. Frans Kaashoek, Robert Morris and Massimiliano Poletto, "Programming language techniques for modular router configurations," Technical Report LCS-TR-812, MIT Laboratory for Computer Science, 2000, pp. 1-22.

Microsoft Security Bulletin MS01-033, "Unchecked Buffer in Index Server ISAPI Extension Could Enable Web Server Compromise," Microsoft TechNet, originally posted Jun. 18, 2001, updated Nov. 4, 2003, 7 pages.

Microsoft Security Bulletin MS02-039, "Buffer Overruns in SQL Server 2000 Resolution Service Could Enable Code Execution," Microsoft TechNet, originally posted Jul. 24, 2002, updated Jan. 31, 2003, 6 pages.

Microsoft Security Bulletin MS03-026, "Buffer Overrun in RPC Interface Could Allow Code Execution," Microsoft TechNet, originally posted Jul. 16, 2003, revised Sep. 10, 2003, 8 pages.

Microsoft Technet, "UrlScan Security Tool," 8 pages, http://www.microsoft.com/technet/security/tools/urlscan.mspx?pf=true, [last accessed Jul. 21, 2005].

Moore, David, Colleen Shannon, and Jeffrey Brown, "Code-Red: a case study on the spread and victims of an internet worm," CAIDA, San Diego Supercomputer Center, University of California, San Diego, 12 pages.

Moore, David, Colleen Shannon, Geoffrey M. Voelker, and Stefan Savage, "Internet Quarantine: Requirements for Containing Self-Propagating Code," IEEE INFOCOM 2003, 10 pages.

Moore, David, Vern Paxson, Stefan Savage, Colleen Shannon, Stuart Staniford and Nicholas Weaver, "Inside the Slammer Worm," Slammer Worm Dissection, IEEE Computer Society, © 2003 IEEE, pp. 33-39.

Paxson, Vern, "Bro: A System for Detecting Network Intruders in Real-Time," 7th USENIX Security Symposium, 1998, pp. 1-18.

Razmov, Valentin and Daniel R. Simon, "Practical Automated Filter Generation to Explicitly Enforce Implicit Input Assumptions," In Proceedings of 17th Annual Computer Security Applications Conference, New Orleans, Louisiana, Dec. 2001, 11 pages.

Rescorla, Eric, "Security holes . . . Who cares?," In Proceedings of USENIX Security Symposium, Aug. 2003, 17 pages.

Richey, Ronald W. and Paul Ammann, "Using Model Checking to Analyze Network Vulnerabilities," Security and Privacy 2000, 2000 IEEE Symposium, © 2000 IEEE, pp. 156-165.

Shankar, Umesh, "Active Mapping: Resisting NIDS Evasion Without Altering Traffic," Report No. UCB//CSD-2-03-1246 Computer Science Division (EECS), University of California, Berkley, Dec. 2002, 38 pages.

Sharpe, Richard, "Just what is SMB?," Oct. 8, 2002, 9 pages, http://samba.anu.edu.au/cifs/docs/what-is-smb.html, [last accessed Jul. 26, 2005].

Singh, Sumeet, Cristian Estan, George Varghese and Stefan Savage, "The EarlyBird System for Real-time Detection of Unknown Worms," Technical Report CS2003-0761, University of California at San Diego, 2003, pp. 1-6.

Staniford, Stuart, Vern Paxson and Nicholas Weaver, "How to Own the Internet in Your Spare Time," Proceedings of the 11th USENIX Security Symposium, San Francisco, California, Aug. 5-9, 2002, 20 pages.

Weaver, Nicholas C., "Warhol Worms: The Potential for Very Fast Internet Plagues," Regents of the University of California, 2001, 9 pages.

Weaver, Nicholas, Vern Paxson, Stuart Staniford and Robert Cunningham, "Large Scale Malicious Code: A Research Agenda," 2003, 43 pages.

Williamson, Matthew M., "Throttling Viruses: Restricting propagation to defeat malicious mobile code," HPL-2002-172, HP Laboratories Bristol, Hewlett-Packard Company, 2002, 7 pages.

* cited by examiner

METHOD AND SYSTEM FOR FILTERING COMMUNICATIONS TO PREVENT EXPLOITATION OF A SOFTWARE VULNERABILITY

CROSS-REFERENCE TO RELATED APPLICATION(S)

This application claims the benefit of U.S. Provisional Application No. 60/547,131, filed on Feb. 24, 2004, entitled "METHOD AND SYSTEM FOR FILTERING COMMUNICATIONS TO PREVENT EXPLOITATION OF A SOFTWARE VULNERABILITY," which is hereby incorporated by reference.

TECHNICAL FIELD

The described technology relates generally to detecting and preventing an exploitation of a vulnerability of an application.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs or other computer programs executing on those computer systems. One of the most destructive methods of attacking a computer system has been to send a "worm" to a computer program. A worm is a self-propagating attack that exploits a vulnerability by taking control of the computer system and using that computer system to launch attacks (i.e., send the same worm) against other computer systems with the same vulnerability. A worm is a message or sequence of messages designed to exploit a vulnerability of the receiving computer program. Upon receiving the message or messages, the computer program performs some action that allows the worm to take control of the computer system.

Developers of applications and administrators of computer systems go to great effort and expense to identify and remove vulnerabilities. Because of the complexity of applications, however, it is virtually impossible to identify and remove all vulnerabilities before applications are released. After an application is released, developers can become aware of vulnerabilities in various ways. A party with no malicious intent may identify a vulnerability in an application and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the application and possibly the computer system on which it is executing may need to be shut down and restarted. If the vulnerability is in an application that is crucial to the success of an organization, then the administrator needs to analyze the tradeoffs of keeping the application up and running with its associated risk of being attacked and of shutting down a crucial resource to install the patch. Some administrators may delay the installation of the patch because they fear that, because of a hasty distribution, it might not be properly tested and have unintended side effects. If the patch has an unintended side effect, then the application (or the computer system) may be shut down by the patch itself. Administrators need to factor in the possibility of an unintended side effect when deciding whether to install a patch. These administrators may delay installing a patch until experience by others indicates that there are no serious unintended side effects.

Other methods are available for preventing the exploitation of vulnerabilities in applications. For example, if the source of an exploitation is known, then all messages from that source can be intercepted and discarded before they reach the application. The source of the attack, however, may not be precisely identifiable, resulting in messages from many benign sources also being discarded. As another example, a message that is attempting to exploit a vulnerability may have a characteristic (e.g., a file name that is too long) that can be detected and discarded before it is sent to the application.

Current methods for preventing exploitation of vulnerabilities are not completely satisfactory for various reasons. The installation of patches is not completely satisfactory because some administrators simply may not install patches fast enough to prevent exploitation of the vulnerabilities. Moreover, a patch could itself have side effects that are more disastrous than the exploitation of the vulnerability. The intercepting of messages to identify an attempted exploitation is also not completely satisfactory because the identifications are based on known exploitations and may not prevent unknown exploitations of the same vulnerability. It would be desirable to prevent the exploitation of vulnerabilities in a way that does not require patches and that is independent of any particular exploitation of the vulnerability.

SUMMARY

A method and system for identifying when a condition of a communication protocol of a component is to be satisfied is provided. In one embodiment, the system provides a specification that specifies at least a portion of the communication protocol (i.e., a model of the communication protocol) and indicates within the specified portion of the communication protocol when the condition is satisfied. When a communication for the component is received, the system determines, before the processing of the communication by the component, whether the received communication would satisfy the condition as specified by the provided specification. The system can then take appropriate action depending on whether the condition is satisfied. For example, if the condition relates to the exposing of a vulnerability of the component, then the system may take the action of not providing the communication to the component when the condition is satisfied to prevent the exposing of the vulnerability.

DETAILED DESCRIPTION

Figure 1:
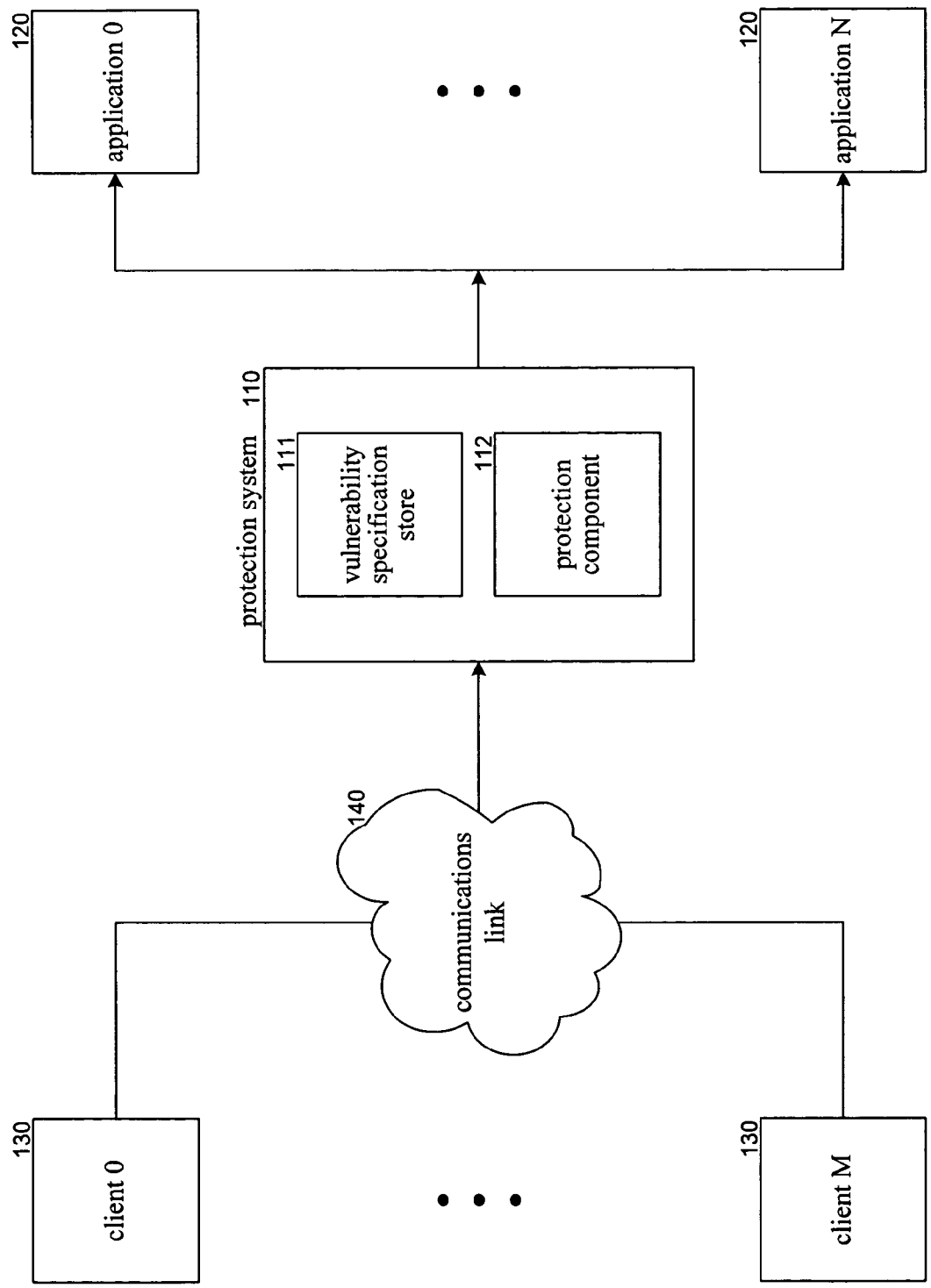
FIG. 1 is a block diagram that illustrates the protection system in one embodiment.

A method and system for protecting a component, such as an application, that implements a communication protocol (e.g., message-based or stream-based protocol) against exploitation of a communication-based vulnerability is provided. In one embodiment, a protection system provides a "protection policy" that specifies how to recognize messages that expose a specific vulnerability and specifies actions to take when the vulnerability is exposed. A protection policy specifies the sequence of messages and their payload characteristics that expose a vulnerability. The protection system may specify the sequences of messages using a message protocol state machine. A message protocol state machine of an application represents the states that the application transitions through as it receives various messages. The message protocol state machine of a protection policy may be a portion of the message protocol state machine of the application relating to the vulnerability. The protection system uses the message protocol state machine to track the states that lead up to exposing the vulnerability. The protection policy may specify actions to be performed depending on the current state and the received or current message. These actions may include checking the payloads of the messages to determine whether certain conditions are met, identifying a next state for the message protocol state machine, discarding a message, disconnecting from the source of a message, and so on. Because the protection policy is based on the message protocol associated with the vulnerability, it is independent of any exploitation of the vulnerability. The protection system thus models the communication-based protocol that is used by the application so that conditions such as the exposing of vulnerabilities can be detected and prevented.

In one embodiment, a protection policy describes a vulnerability of an application and actions to protect against exploitation of the vulnerability. A protection policy has two parts. The first part defines protocol states, events, and generic application-level protocol information, such as ports used, locations of event types, session identifiers, and sequence numbers in a packet, and message boundary markers. The second part defines handlers (i.e., sets of actions) and message payload parsing instructions. The handlers are executed at runtime to examine a message payload and identify any exploitation of the vulnerability, and to take countermeasures to prevent its exploitation or to record session information that is needed for a later identification of an exploitation. Prior to runtime, the protection system parses the handlers and the payload instructions of a protection policy and stores them in a syntax tree for more efficient processing at runtime. The protection system stores the first part of the protection policy and the syntax tree as a "vulnerability specification." The vulnerability specification may include triplets of state, event, and handlers.

When the protection system receives a message before it has been sent to the application, it identifies the event corresponding to the message and the current state of the message protocol state machine of the application. The protection system then identifies and executes the handler associated with the current state and the current event as indicated by the triplets. The handler may analyze the message, including its payload, to determine whether characteristics leading to the exposing of the vulnerability are present, may change the current state to a next state that depends on the characteristics of the message, may save state information needed to make subsequent determinations when other messages are received, may perform counteractions against identified exploitations, and so on. If the protection system determines that a message would expose the vulnerability, it does not provide the message to the application. The protection system thus prevents the exploitation of a vulnerability of an application without patching the application. Moreover, the protection system provides a generic framework that can be used to prevent exploitation of vulnerabilities for many different message-based applications.

In one embodiment, the protection system operates between the transport layer and the application layer of the network protocol. One skilled in the art will appreciate, however, that the protection system can operate in between or within various network protocol layers and multiple protocol layers simultaneously. For example, some applications may provide hooks for pre-processing messages before the application performs its processing. With such applications, the protection system can operate at the application layer and process the messages before the application processes the message. If the protection system determines that a vulnerability is exposed, then it can discard the message, abort the application, or take some other appropriate action.

Applications that service multiple clients may assign a session identifier to each client for use in identifying which client sent a message. A single client may have multiple sessions and thus multiple session identifiers. In which case, a session identifier identifies a particular session of a client. A sequence of messages within a session can expose a vulnerability. Thus, the protection system tracks the state of messages on a session-by-session basis. The protection system creates a new instance of state information when a new session is identified. Each message identifies the target application and session. When a message is received, the protection system identifies the application and the session from the message. The protection system may identify the application based on a port number stored in header information of the message and the session based on an application-specific indication of where session information is stored within the message. The vulnerability specification of an application may specify the port numbers associated with that application and describe the location of a session identifier within the messages of that application. In addition, the vulnerability specification of an application may specify the location of other information within a message such as the location of message type and the location of a message boundary. If the message is the first of a session, then the protection system may allocate a state information data structure for that session. The vulnerability specification of an application may define the data structure based on the information that needs to be stored from message to message. The protection system initializes the state information, which may include setting the current state for the session to an initial state defined by the vulnerability specification. Whenever a new message is received, the protection system identifies the application and session, retrieves the state information for that application and session, and then invokes a state machine engine to select a handler to execute based on the current state and an event specified by the received message.

In one embodiment, the protection system handles application-level messages that may not arrive as a single message unit. The scattered arrival of a single application-level message as multiple message units may be a result of TCP congestion control, specific message handling implementations of an application, and so on. For example, a UDP server may make multiple calls to receive a single application-level message. In such a case, the protection system recognizes the arrival of multiple message units for the application-level message. When the session identifier or the message type is not received in a single message unit or not enough of the application-level message has been received for a handler to finish its processing, the protection system makes a copy of the needed portions of each message unit until the application-level message can be processed by a handler. The protection system could store the partial message information on a session-by-session basis, which might require the allocation of a buffer for each session. When, however, multiple sessions are sent through the same socket, the protection system may be able to store the partial message information on a socket-by-socket basis. Sockets typically have the characteristic that a complete message for a session will be received before any portion of a different message is received via that same socket. Because there may be fewer sockets than sessions, fewer buffers may need to be allocated when storing the information on a session-by-session basis. A buffer can be associated with only a socket before the session identifier is received. Once the session identifier is received, the buffer can be associated with the session.

In general, the protection system does not need to save partially arrived fields, nor does it need to save the entire portion of the application-level message that has been received. For example, if two bytes out of a four-byte session identifier have been received, then the protection system need only save those two bytes of the message. The protection system may use a field parsing state per application-level message to track which field is being parsed and how many bytes have been received. The protection system maintains the parsing state of the current field being parsed for each application-level message, even when it has been determined that the message will not lead to an exploitation. If the state was not maintained, then other parts of the application-level message might be treated as a new message. In such a case, a message might be crafted by an attacker to cause an inconsistency between the actual message state of the application and the emulated message state of the protection system.

The protection system may buffer application-level messages that are received out of order so that they can be processed in order. For example, when UDP is used, application-level messages can be received out of order. The protection system uses the sequence number as specified in a protection policy for the application. In addition, some application message protocols allow for fragmentation and reassembly of application-level messages. The fragments can be received in order (e.g., with TCP) or out of order (e.g., with UDP). The protection system can handle the fragments received in order in a manner similar to the partial-field processing described above. If the fragments are received out of order, the protection system can save them and process them in order.

In one embodiment, the principles of the protection system can be applied to augment a message protocol. For example, it might be desirable to improve the security of an application by adding authentication processing at some state of the message protocol. The developer of the application may be, however, reluctant to do so. In such a case, a system (e.g., an authentication system) similar to the protection system could be implemented. The authentication system may have a server side and a client side. The server side would use a specification of states, events, and handlers and a state machine engine to identify the appropriate state and event when authentication should occur. The handler for that state and event could send a challenge to a client before providing the message to the application. Upon receiving the challenge, the client side of the authentication system could detect that a challenge has been received and send the appropriate response. The client side may have specifications and a state machine engine for detecting the challenge. When the server side receives the response, it can validate the response and provide the message to the application as appropriate. More generally, a generic architecture is provided that can track message protocol states and perform the desired processing prior to processing by the target application. Although the architecture may be symmetric on a client and a server, the specifications are asymmetric because of the different processing needs of a server and its client. The generic architecture could be used to implement an encryption scheme, logging of messages, debugging of problems, and so on.

In one embodiment, the protection system may intercept messages by instrumenting application programming interfaces ("APIs") to process the messages. For example, the receive function of a sock layer API may be instrumented to invoke the underlying, non-instrumented receive function and then to pass a buffer containing the message to the protection component. If the protection component determines that the message will exploit a vulnerability, the protection may discard the message or tear down the communication session, and the instrumented receive function may return an error. Otherwise, the instrumented receive function may return the buffer as would the non-instrumented receive function. The protection system may be used to intercept messages or portions of messages at various levels in a hierarchy of APIs. A hierarchy of APIs includes APIs that invoke lower-level APIs, which in turn invoke still lower-level APIs. A programmer of an application typically develops the application to invoke the highest level APIs. For example, an application may invoke a get order function of a customer relationship management system ("CRM") API to retrieve a new order from a customer. The get order function may invoke a get header function and repeatedly invoke a get line item function of a lower-level ordering API to aggregate the order information for return to the application. The get line item function may invoke the receive function of the socket layer API to retrieve the next line item message sent from the customer. The get order function of the CRM API may be instrumented to pass the new order to the protection system. The protection system may have handlers to analyze a new order parameter, and determine whether it would exploit a vulnerability. The protection system may be used here to detect and correct the parameters that would exploit a vulnerability. For example, the protection system may be used to determine whether a new order from a customer can be authenticated. If not, the protection system can discard the new order and return an error to the application. Thus, the protection system can be used to analyze the semantics of messages at various levels of abstraction.

FIG. 1 is a block diagram that illustrates the protection system in one embodiment. The protection system 110 is connected to clients 130 via communications link 140 and to applications 120. The protection system and the applications may execute on the same computer system, each on a different computer system, or some combination thereof. The protection system includes a vulnerability specification store 111 and a protection component 112. The vulnerability specification store contains a vulnerability specification for each application. When a message is received from a client via the communications link, the protection component identifies the application to which the message is directed and the session within that application. The protection component transitions the message state for that session based on the vulnerability specification for that application. The messages that do not lead to exploits against a vulnerability are handed to the application directly. The protection component, in contrast, may drop messages that would exploit the vulnerability and take other appropriate action such as tearing down the session. The vulnerability specification store may be loaded and unloaded dynamically with new specifications as new vulnerabilities are discovered without interrupting the operation of the protection system.

Figure 2:
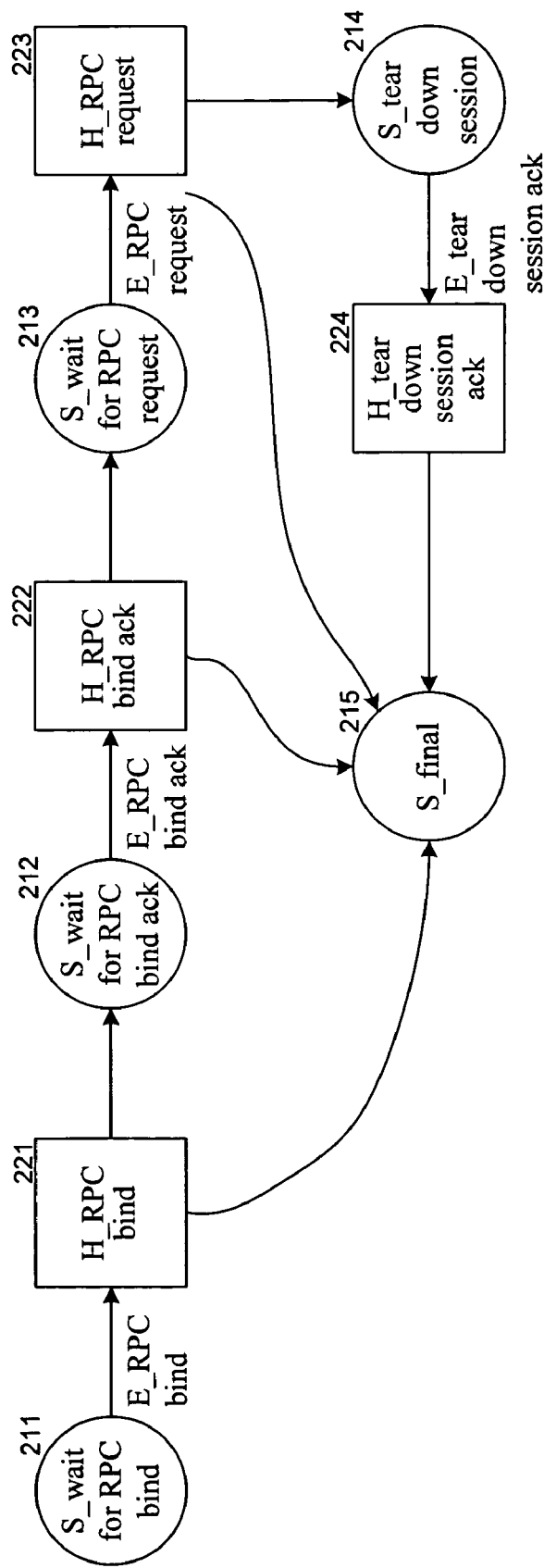
FIG. 2 is a state diagram that illustrates a portion of a message protocol defined in a vulnerability specification in one embodiment.

FIG. 2 is a state diagram that illustrates a portion of a message protocol defined in a vulnerability specification in one embodiment. States 211-215 represent message protocol states of an application relating to the vulnerability. These states are a subset of the message states of the application. Handlers 221-224 represent sets of actions that are performed as the message state associated with a session transitions from state to state as messages are received. State 211 is the initial state of a session and indicates that the session is waiting for an RPC bind message. When in state 211 and an RPC bind message is received, the protection system executes the RPC bind handler 221. The RPC bind handler sets the next state of the session to state 212, which is waiting for an RPC bind acknowledgment, or to state 215, which is the final state of the session. When in state 212 and an RPC bind acknowledgment message is received, the protection system executes the RPC bind acknowledgment handler 222. The RPC bind acknowledgment handler transitions to state 213, which waits for an RPC request, or to state 215, which is the final state. When in state 213 and an RPC request message is received, the protection system executes the RPC request handler 223. If the RPC request handler determines that a vulnerability would be exposed based on the content of the message, then it sets the next state to state 214, which indicates to tear down the session, else it sets to state 215, which is the final state. When in state 214 and the tear down request is acknowledged, the protection system invokes the tear down session acknowledgment handler 224 to complete the tear down of the session and transitions to state 215, which is the final state. Handlers 221 and 222 may allow the messages to be sent to the application, but handler 223 may not allow the message to be sent to the application when the next state is state 214.

Figure 3:
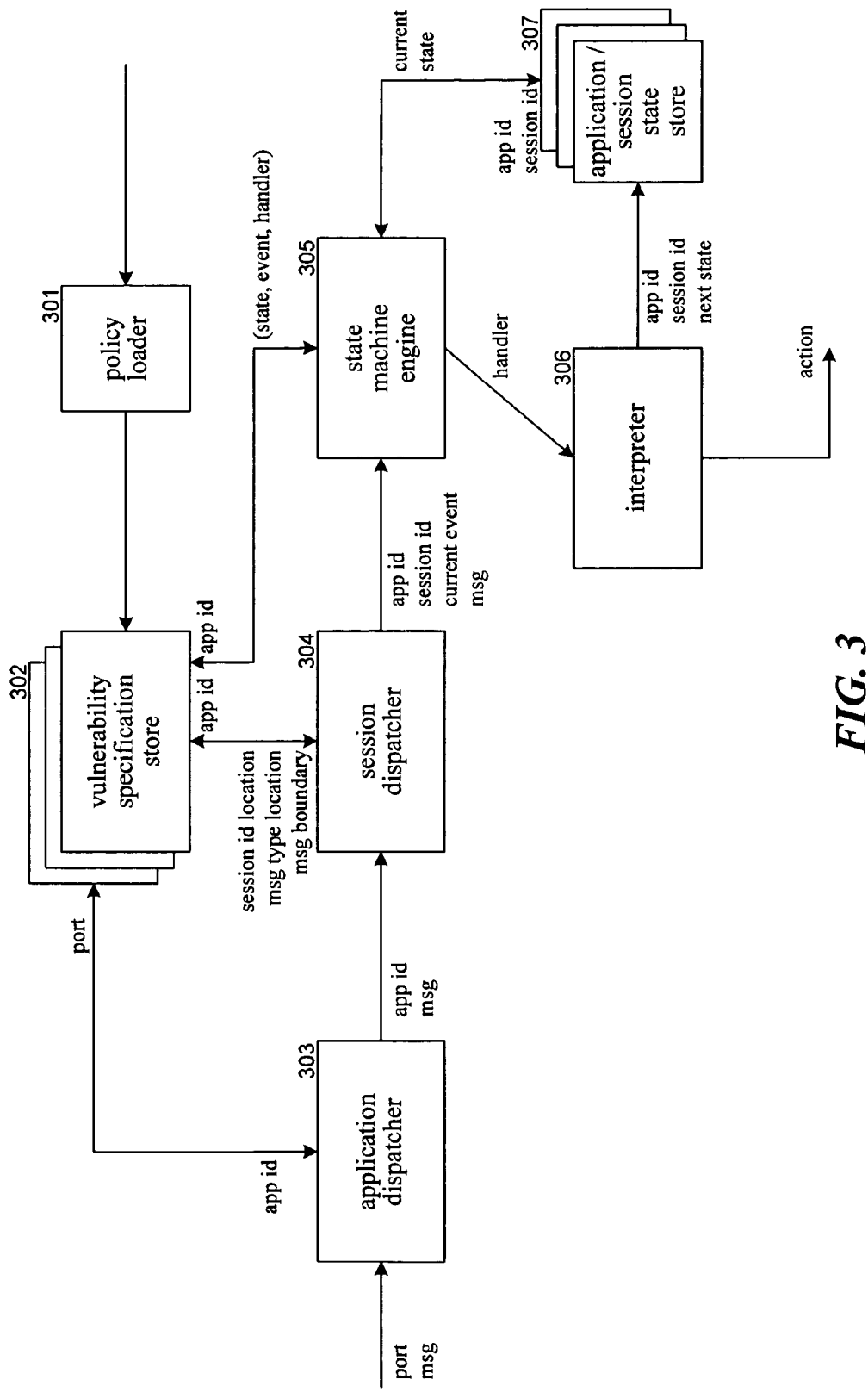
FIG. 3 is a block diagram that illustrates the architecture of the protection system in one embodiment.

FIG. 3 is a block diagram that illustrates the architecture of the protection system in one embodiment. The protection system includes a policy loader 301, an application dispatcher 303, a session dispatcher 304, a state machine engine 305, and an interpreter 306. The protection system also includes a vulnerability specification store 302 and an application/session state store 307. The policy loader receives protection policies for vulnerabilities, converts protection policies to vulnerability specifications, and stores them in the vulnerability protection store. The policy loader may automatically combine vulnerability specifications for the same application so that each application has only one vulnerability specification. A message that is received by the protection system is first processed by the application dispatcher. The application dispatcher identifies the port associated with the message from the message header and then requests the vulnerability specification store to identify the application associated with that port number. The vulnerability specification store responds with the application identifier. The application dispatcher then forwards the application identifier and the message to the session dispatcher. The session dispatcher identifies the session associated with the message. The session dispatcher requests the vulnerability store to provide session identification information associated with the application identifier. The vulnerability specification store responds with the information describing the location of the session identifier within the message and may also provide the location of the message type and message boundary and other header or payload descriptive information. The session dispatcher then uses the location information to retrieve the session identifier from the message. The session dispatcher may also analyze the message to identify a message event associated with the message. In one embodiment, there may be a one-to-one correspondence between message types and events. The state machine engine receives the application identifier, session identifier, current event, and message from the session dispatcher. The state machine engine provides the application identifier to the vulnerability specification store and requests the state machine triplets associated with that application identifier. The state machine engine also provides the application identifier and session identifier to the application/session state store and requests the associated state information. Upon receiving the triplets and state information, the state machine engine searches for a triplet that matches the current state and the current event. When a match is found, the state machine engine directs the interpreter to execute the handler associated with the matching triplet. The interpreter executes the handler, which performs the actions defined by the corresponding protection policy. The actions may include storing state information such as the next state in the application/session state store. The handlers may also retrieve information from the application/session state store, for example, that was stored by a handler processing a previous message of the session.

The computing device on which the protection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the protection system. In addition, data structures and message structures may be stored or transmitted via a data transmission medium, such as a signal on a communications link. Various communications links may be used, such as the Internet, a local area network, a wide area network, or a point-to-point dial-up connection.

FIG. 3 illustrates an example of a suitable operating environment in which the protection system may be implemented. The operating environment is only one example of a suitable operating environment and is not intended to suggest any limitation as to the scope of use or functionality of the protection system. Other well-known computing systems, environments, and configurations that may be suitable for use include personal computers, server computers, hand-held or laptop devices, routers, switches, multiprocessor systems, microprocessor-based systems, programmable consumer electronics, network PCs, minicomputers, mainframe computers, distributed computing environments that include any of the above systems or devices, and the like.

The protection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The term "application" refers to any type of executing software such as drivers, kernel-mode code, operating systems, system utilities, web servers, database servers, and so on.

Table 1 illustrates a portion of a protection policy in one embodiment. The protection policy may be developed using a special-purpose language. A protection policy has a first part with application and state machine information, and a second part with handlers and payload instructions. The lines that start out with "#" are comments. The application information (lines 1-5) describes location and port information. The state machine information (lines 6-28) describes the states, events, and triplets. The handlers (lines 46-67) define processing to be performed. The payload instructions (lines 29-45) specify how to parse the field of a message of the application. The payload instructions need only to define the field used in detecting an exploitation. The other fields can be lumped together and skipped over during field parsing. The handlers could theoretically be written in any programming language. A language should be used that would make it difficult to attack the protection policies themselves. A special-purpose programming language has been developed to help prevent such attacks. In the handlers of Table 1, the language uses data types of Boolean, counter (e.g., integer), and word and byte arrays. The language also provides various operations such as drop a message, tear down a session, determine message length, and so on. The operation ">>payload" (e.g., line 49) indicates to parse the payload (e.g., payload is "P_RPCRequest buffer size) according to the specified payload instructions. The language may also allow statements such as if-then statements, special-purpose for-loops, and so on. The special-purpose for-loops are used for iterative payload structures. In one embodiment, the handlers are interpreted at runtime by an interpreter.

TABLE 1

```
1   # SHIELD (Name, Transport_Protocol, (port-list))
2   SHIELD (Vulnerability_Behind_MSBlast, TCP, (135, 139, 445))
3   # where to retrieve SESSION_ID and MSG_TYPE from
4   SESSION_ID_LOCATION = (12, 4);
5   MSG_TYPE_LOCATION = (2, 1);
6   INITIAL_STATE S_WaitForRPCBind;
7   FINAL_STATE S_Final;
8   STATE    S_WaitForRPCBindAck;
9   STATE    S_WaitForRPCAlterContextResponse;
10  STATE    S_WaitForRPCRequest;
11  STATE    S_WaitForSessionTearDown;
12  # EVENT eventName = (<eventTypeValue>, <direction>)
13  EVENT E_RPCBind = (0x0B, INCOMING);
14  EVENT E_RPCBindAck = (0x0C, OUTGOING);
15  EVENT E_RPCBindNak = (0x0D, OUTGOING);
16  EVENT E_RPCAlterContext = (0x0E, INCOMING);
17  EVENT E_RPCAlterContextResponse = (0x0F, OUTGOING);
18  EVENT E_RPCRequest = (0x0, INCOMING);
19  EVENT E_RPCShutdown = (0x11, OUTGOING);
20  EVENT E_RPCCancel = (0x12, INCOMING);
21  EVENT E_RPCOrphaned = (0x13, INCOMING);
22  STATE_MACHINE = {
23  # (State, Event, Handler),
24  (S_WaitForRPCBind, E_RPCBind, H_RPCBind),
25  (S_WaitForRPCBindAck, E_RPCBindAck, H_RPCBindAck),
26  (S_WaitForRPCRequest, E_RPCRequest, H_RPCRequest),
27  ...
28  };
29  # payload parsing instruction for P_Context
30  PAYLOAD_STRUCT {
31     SKIP BYTES(6)    dummy1,
32     BYTES(1)         numTransferContexts,
33     SKIP BYTES(1)    dummy2,
34     BYTES(16)        UUID_RemoteActivation,
35     SKIP BYTES(4)    version,
```

TABLE 1-continued

```
36     SKIP BYTES (numTransferContexts * 20) allTransferContexts,
37  } P_Context;
38  # payload parsing instruction for P_RPCBind
39  PAYLOAD_STRUCT {
40     SKIP BYTES(24)   dummy1,
41     BYTES(1)         numContexts,
42     SKIP BYTES(3)    dummy2,
43     P_Context[numContexts] contexts,
44  ...
45  } P_RPCBind;
46  HANDLER H_S_RPCBind (P_RPCBind)
47  {
48     # if invoking the RemoteActivation RPC call
49     IF (>>P_RPCBind.contexts[0] ==
           0xB84A9F4D1C7DCF11861E0020AF6E7C57)
50        RETURN (S_WaitForRPCBindAck);
51     FI
52     RETURN (S_Final);
53  };
54  HANDLER H_RPCBindAck (P_RPCBindAck)
55  {
56     RETURN (S_WaitForRPCRequest);
57  };
58  HANDLER H_RPCRequest (P_RPCRequest)
59  {
60     IF (>>P_RPCRequest.bufferSize > 1023)
61        TEARDOWN_SESSION;
62        PRINT ("MSBlast!");
63        # since other RPC requests can come as well
64        RETURN (S_Final);
65     FI
66     RETURN (S_WaitForSessionTearDown);
67  };
68  # ... other PAYLOAD_STRUCTs and Handlers not included here ...
```

Figure 4:
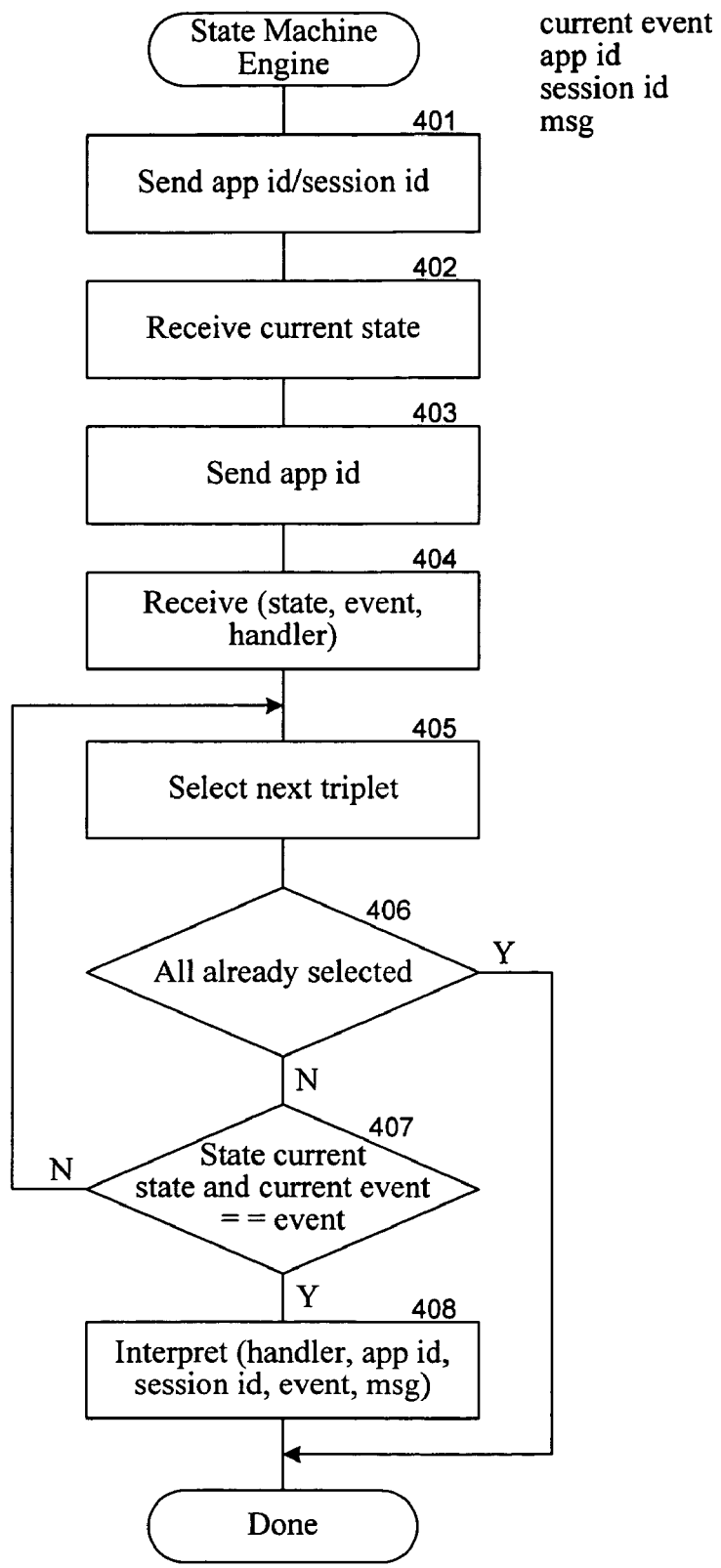
FIG. 4 is a flow diagram that illustrates the processing of the state machine engine in one embodiment.

FIG. 4 is a flow diagram that illustrates the processing of the state machine engine in one embodiment. The engine is passed a current event, an application identifier, a session identifier, and a message. In block 401, the engine provides the application identifier and session identifier to the application/session state store. In block 402, the engine receives the current state for the application identifier and session identifier from the application/session state store. In block 403, the engine provides the application identifier to the vulnerability specification store. In block 404, the engine receives the state machine triplets for the application identifier from the vulnerability specification store. In blocks 405-407, the engine loops determining whether a triplet matches the current state and the current event. In block 405, the engine selects the next triplet. In decision block 406, if all the triplets have already been selected, then the engine completes, else the engine continues at block 407. The set of triplets may include a default triplet that identifies a handler to be executed if no other triplets match the current state and current event. In addition, the state and event of a triplet may be regular expressions that define states and events that match the triplet. In decision block 407, if the state of the triplet matches the current state and the event of the triplet matches the current event, then the engine continues at block 408, else the engine loops to block 405 to select the next triplet. In block 408, the engine invokes the interpreter passing the handler, application identifier, session identifier, current event, and message. The engine then completes.

Figure 5:
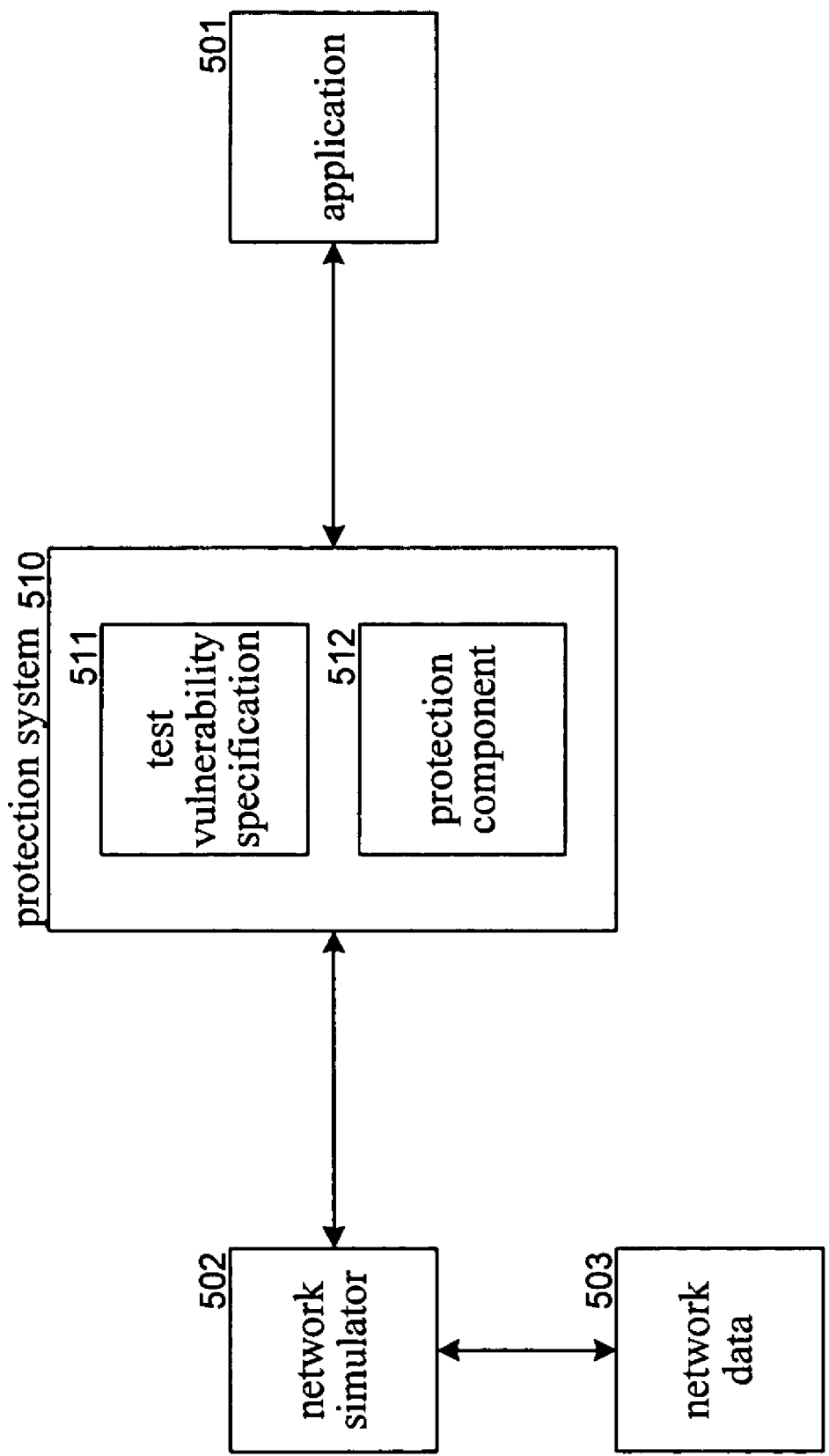
FIG. 5 is a block diagram that illustrates the testing of a vulnerability specification in one embodiment.

FIG. 5 is a block diagram that illustrates the testing of a vulnerability specification in one embodiment. The protection system 510 includes the vulnerability specification 511 that is to be tested. The protection system also includes protection component 512, which may correspond to the application dispatcher, the session dispatcher, the state machine engine, and the interpreter of FIG. 3. The protection system provides messages to the application 501 whose vulnerability is represented by the vulnerability specification. The network simulator 502 passes messages to the protection system. The messages may be retrieved from network data 503 that has been collected from typical message sequences that are provided to the application or may be a synthetic test suite of representative traffic. Because the protection system is not a patch to the application, the testing is simplified. In particular, side effects associated with the protection system can be more easily isolated than those of a typical application. From the application's perspective, the protection system either provides messages or drops messages. If the network data does not include a sequence of messages that exposes the vulnerability, then all messages should pass through the protection system and be provided to the application. If a message is discarded by the protection system, that may indicate a problem with the vulnerability specification or may indicate that an exposing of the vulnerability has been detected.

Figure 6:
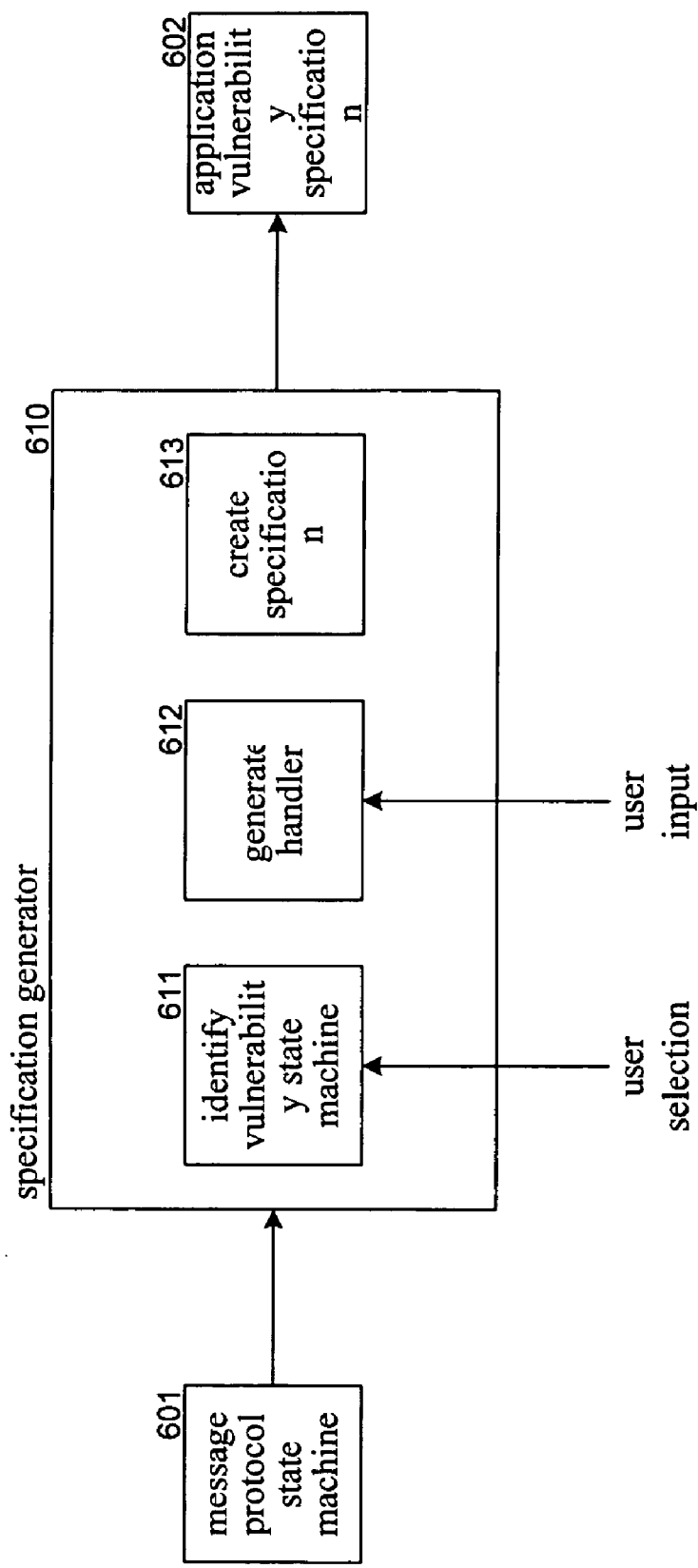
FIG. 6 is a block diagram that illustrates the generation of a vulnerability specification in one embodiment.

FIG. 6 is a block diagram that illustrates the generation of a vulnerability specification in one embodiment. Vulnerability specifications may be generated automatically or semiautomatically based on a standard definition for the message protocol state machine for applications. The specification generator 610 inputs a message protocol state machine description 601 for an application defined using the standard definition. The specification generator processes the state machine and outputs the appropriate vulnerability specification 602. The specification generator includes an identify vulnerability state machine component 611, a generate handler component 612, and a create specification component 613. The identify vulnerability state machine component receives user input to identify the portion of the state machine that exposes the vulnerability. The user input may select the states that lead to exposing the vulnerability and may provide various conditions for the states to indicate how and in what instances each state is considered to expose the vulnerability. For example, it may be that a certain message exposes a vulnerability, but only if a prior message contained certain content. The generate handler component may automatically generate the handlers based on user input. The create specification component generates the vulnerability specification or a protection policy from the vulnerability state machine and the handlers.

One skilled in the art will appreciate that although specific embodiments of the protection system have been described herein for purposes of illustration, various modifications may be made without deviating from the spirit and scope of the invention. For example, if the payload of a message is encrypted, the protection system may request the application for a decryption key. The protection system can then decrypt the message and process the decrypted message. The protection system can provide the un-decrypted version of the message to the application. Alternatively, the protection system may retrieve the decryption key from a key vault of the application. A decryption key may also be provided to the protection system by a system administrator or key escrow system. As another example, if ports are dynamically assigned to an application, a vulnerability specification can be developed to detect such a port and register the port for that application with the vulnerability specification store. Although the protection system has been described primarily in the context of message-based protocols, the principles of the protection system can also be applied to stream-based protocols. Also, the protection policies may use regular expressions in place of a finite state machine. The protection system may be used in conjunction with the techniques described in U.S. Provisional Patent Application No. 60/547,415, entitled "METHOD AND SYSTEM FOR DYNAMIC SYSTEM PROTECTION," and filed on Feb. 23, 2004, which is hereby incorporated by reference. As described in that application, protection policies can be automatically enabled or disabled depending on the patches that have been applied to an application. The protection system can be used to detect attempted exploits of vulnerabilities based on invoking application programming interfaces ("APIs") of an application. An API provides an interface through which programs can access the services of the application. The interface defines a communication protocol for a program to communicate with the application. Thus, the term "communication protocol" refers to procedures and rules for communicating between components and is not limited to the protocols of the ISO protocol stack. Accordingly, the invention is not limited except by the appended claims.

We claim:

1. A method in a computer system with a processor and a memory for identifying when communications with a component exposes a vulnerability of the component, the component having a communication protocol with communication protocol states that the component transitions through as it receives communications, the method comprising:

providing a specification that specifies at least a portion of the communication protocol states of the component along with characteristics of communications associated with transitioning from one communication protocol state to another communication protocol state and indicates a communication protocol state when the vulnerability is exposed, the specification being independent of any exploitation of the vulnerability, an exploitation being a particular sequence of communications;

receiving a plurality of communications for the component; and before each received communication is processed by the component, determining a current communication protocol state of the component;

determining a next communication protocol state of the component based on the provided specification and the received message;

when the next communication protocol state is the indicated communication protocol state in which the vulnerability is exposed, not providing of the received communication to the component; and when the next communication protocol state is not the indicated communication protocol state, providing the received communication to the component; and setting the current protocol state to the next protocol state.

2. The method of claim 1 wherein the provided specification defines a state machine for controlling processing of communications.

3. The method of claim 2 wherein the state machine defines communication protocol states of the communication protocol and events to transition between communication protocol states.

4. The method of claim 2 wherein the specification specifies action to perform when transitioning between the communication protocol states.

5. The method of claim 4 wherein the determining is performed by a state machine engine that inputs the specification, a current communication protocol state, and a current event, selects a handler identified in the specification for the current communication protocol state and the current event and directs the execution of the handler to perform an action.

6. The method of claim 1 wherein the current communication protocol state is set on a per-component basis.

7. The method of claim 1 wherein the current communication protocol state is set on a per-session basis.

8. The method of claim 1 wherein the component handles multiple sessions and the determining of a communication protocol state is based only on communications of one session.

9. A system for detecting when a vulnerability of an application would be exposed as a result of messages being sent to the application, comprising:

a memory storing:
 a specification for the application that defines a state machine that indicates when a message would expose the vulnerability of the application and defines actions to take to prevent exposing the vulnerability of the application, the state machine specifying communication protocol states that the application transitions through as it processes messages of a communication protocol used by the application, the specification being independent of any exploitation of the vulnerability, an exploitation being a particular series of messages;
 a state store that stores a current communication protocol state of the application as represented by the state machine; and
 an engine with computer executable instructions that receives messages for the application,
 retrieves the current communication protocol state of the state machine for the application, and
 identifies from the specification for the application actions to perform when in the retrieved current communication protocol state and that message is received; and
a processor for executing the computer-executable instructions stored in the memory.

10. The system of claim 9 wherein the state store stores state information on a per-session basis.

11. The system of claim 9 including a dispatcher that uses the specification to identify an application that is the target of a message based on a port identifier of the message.

12. The system of claim 9 including a dispatcher that identifies a session associated with a message based on a location of a session identifier within a message as defined by the specification for the application.

13. The system of claim 9 wherein when multiple vulnerabilities are defined for an application, a single specification is used to specify the vulnerabilities.

14. The system of claim 9 including a store that contains portions of a message until the entire message is received.

15. The system of claim 14 wherein the portions of the message are stored on a per-socket basis.

16. A computer-readable storage medium for controlling a computer system to identify when messages expose a vulnerability of an application, the application having a message protocol with message protocol states that the application transitions through as it receives messages, by a method comprising:

providing a specification that specifies at least a portion of the message protocol states of the application and indicates when, within the specified portion of the message protocol states, the vulnerability of the application is exposed, the provided specification defining a state machine for controlling processing of messages, the state machine defining message protocol states of the message protocol and events to transition between message protocol states, the specification being independent of any exploitation of the vulnerability, an exploitation being a particular sequence of messages;

receiving messages for the application;

determining whether a received message would expose the vulnerability of the application based on the specified portion of the message protocol states of the application, a current message protocol state, and the received message;

when it is determined that the vulnerability would be exposed, not providing the received message to the application; and when it is determined that the vulnerability would be exposed, providing the received message to the application.

* * * * *